United States Patent [19]

Suzuki

[11] Patent Number: 4,850,622
[45] Date of Patent: Jul. 25, 1989

[54] PIPE JOINT

[75] Inventor: Hiroshi Suzuki, Hiratsuka, Japan

[73] Assignee: Yokohama Aeroquip Corporation, Tokyo, Japan

[21] Appl. No.: 108,964

[22] Filed: Oct. 16, 1987

[30] Foreign Application Priority Data

May 29, 1987 [JP] Japan ............................ 62-080969[U]

[51] Int. Cl.⁴ .............................................. F16L 13/02
[52] U.S. Cl. .................................... 285/286; 285/321;
285/347; 285/351; 285/382; 285/308; 285/906
[58] Field of Search ............... 285/321, 286, 382, 924,
285/351, 317, 348, 347, 308, 906

[56] References Cited

U.S. PATENT DOCUMENTS

| | | |
|---|---|---|
| 2,438,107 | 3/1948 | Bubbitt ............................ 285/321 X |
| 3,286,523 | 11/1966 | Barrows et al. . |
| 3,540,760 | 11/1970 | Miller et al. . |
| 3,684,321 | 8/1972 | Hundhausen et al. . |
| 3,773,360 | 11/1973 | Timbers . |
| 3,948,548 | 4/1976 | Voss . |
| 4,055,359 | 10/1977 | McWethy . |
| 4,133,564 | 1/1979 | Sarson et al. . |
| 4,135,745 | 1/1979 | Dehar . |
| 4,332,402 | 6/1982 | Shellhause . |
| 4,699,403 | 10/1987 | Wong ................................. 285/321 |

FOREIGN PATENT DOCUMENTS

| | | |
|---|---|---|
| 836399 | 3/1970 | Canada ................... 285/321 |
| 3502424 | 7/1986 | Fed. Rep. of Germany . |
| 60-127185 | 8/1985 | Japan . |
| 572184 | 1/1976 | Switzerland ........................ 285/348 |

Primary Examiner—Dave W. Arola
Attorney, Agent, or Firm—Birch, Stewart, Kolasch & Birch

[57] ABSTRACT

A pipe joint for connecting two pipes to each other has a joint member to which one of the pipes is fixed and provided with a bore formed therein, a socket member fixed to the outer peripheral surface of the joint member and provided at its one end with a flange having an opening and also with an annular space defined by the flange, a retainer ring composed of a plurality of segments each having a tapered surface confronting the opening, the segments being arranged in the circumferential direction and held by an elastic band fitting on the outer peripheral surfaces thereof such that the retainer ring composed of the segments can expand and contract radially, and a male member constituted by the other of the pipes and having a bead portion protruding radially outwardly from the outer peripheral surface of the male member at a position near the end of the male member. The retainer ring has an inside diameter smaller than the outside diameter of the bead so that, when the male member is inserted into the bore in the joint member through the opening, the bead portion produces a wedging action on the tapered surfaces of the segments of the retainer ring so as to radially expand the retainer ring overcoming the force of the elastic band thereby allowing the bead portion to clear the retainer ring. After the bead portion has passed the retainer ring, the retainer ring is contracted radially by the force of the elastic band so as to engage with the rear side of the bead portion.

4 Claims, 5 Drawing Sheets (A)

(B)

(A)

(B)

PIPE JOINT

BACKGROUND OF THE INVENTION

The present invention relates to a pipe joint and, more particularly, to a quick connect pipe joint in which one of two pipes to be connected is utilized as a male member.

Japanese Utility Model Laid-Open Publication No. 127185/1985 discloses a pipe joint having a female member coupled to the end of one of pipes to be connected and provided with a male screw on the outer periphery and a hexagonal head, a male member constituted by the other of the pipes to be connected and provided on the end thereof with a bead, and a union nut rotatably held by the bead. In use, the male member with a sealing member fitted thereon is inserted into the female member and the union nut is screwed onto the male screw thread on the female member so that two pipes are hermetically connected to each other.

This known pipe joint, however, requires a wrench for screwing the union nut onto the male screw of the female member and, hence, is not recommended from the view point of efficiency of the work for connecting two pipes.

SUMMARY OF THE INVENTION

Accordingly, an object of the present invention is to provide a quick connect pipe joint which is capable of quickly connecting two pipes without requiring any special tool.

To this end, according to the present invention, there is provided a pipe joint for connecting two pipes to each other comprising: a joint member to which one of the pipes is fixed and provided with a bore formed therein; a socket member fixed to the outer peripheral surface of the joint member and provided at its one end with a flange having an opening and also with an annular space defined by the flange; a retainer ring composed of a plurality of segments each having a tapered surface confronting the opening, the segments being arranged in the circumferential direction and are held by an elastic band fitting on the outer peripheral surfaces thereof such that the retainer ring composed of the segments can expand and contract radially; and a male member constituted by the other of the pipes and having a bead portion protruding radially outwardly from the outer peripheral surface of the male member at a position near the end of the male member; wherein the retainer ring has an inside diameter smaller than the outside diameter of the bead so that, when the male member is inserted into the bore in the joint member through the opening, the bead portion produces a wedging action on the tapered surfaces of the segments of the retainer ring so as to radially expand the retainer ring overcoming the force of the elastic band thereby allowing the bead portion to clear the retainer ring and, when the bead portion has passed the retainer ring, the retainer ring is contracted radially by the force of the elastic band so as to engage with the rear side of the bead portion.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
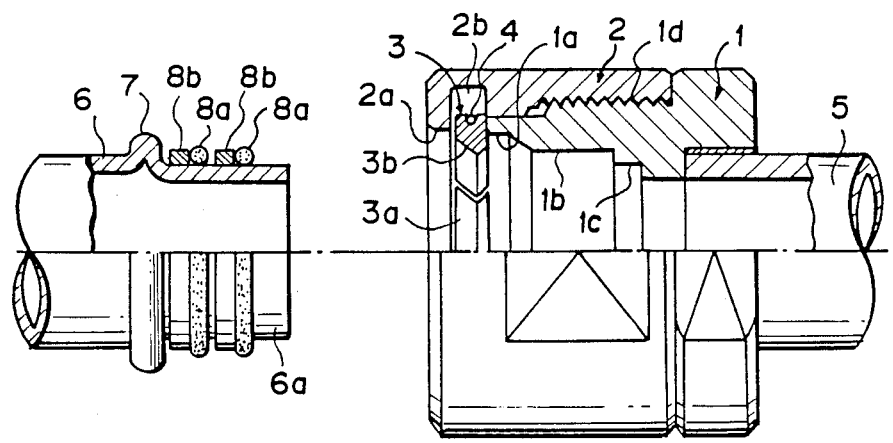
FIG. 1 is a fragmentary partly-sectioned elevational view of a first embodiment of the pipe joint in accordance with the present invention in a disconnected state.

A first embodiment of the pipe joint in accordance with the present invention will be described with reference to FIGS. 1 to 3.

This embodiment of the pipe joint is mainly constituted by a joint member 1, a socket member 2, a retainer ring 3 and a pipe 6 which is to be connected.

One pipe 5 of two pipes 5,6 to be connected is inserted into and brazed to the joint member 1. The other 6 of the pipes is adapted to be inserted into the other end, i.e., left end, of the joint member 1 so as to be connected to the pipe 5 through the joint member 1.

The joint member has a bore which has three portions 1a, 1b and 1c of different diameters. The bore portion 1a of the greatest diameter is adapted to receive a bead portion 7 formed on the pipe 6, while the extreme end 6a of the pipe 6 fits in the bore portion 1c of the smallest diameter. The bore portion 1b of the intermediate diameter is positioned between the bore portions 1a, 1c of the greatest and the smallest diameters, and is connected to the bore portion 1a through a tapered surface. The joint member 1 is provided with an external male screw thread 1d.

The socket member 2 is provided on one end (left end as viewed in FIG. 1) thereof with an annular flange having an opening 2a. An annular space 2b is defined inside the annular flange 2a. The socket member 2 is provided with an internal female screw thread at the end thereof opposite to the annular flange 2a. The female screw thread is adapted to engage with the male screw thread 1d on the joint member 1. Thus, the socket member 2 is adapted to be screwed onto the joint member by virtue of the engagement between the internal female screw thereof and the external male screw 1d on the joint member 1. The diameter of the opening defined by the annular flange 2a is slightly greater than the diameter of the bead portion 7 on the pipe 6.

Referring specifically to FIGS. 3A and 3B, the retainer ring 3 has a plurality of segments 3a arranged in the circumferential direction, and a continuous elastic band 4 made of a rubber, a plastic or a coiled metallic wire. Thus, the retainer ring 3 is radially expandable and contractable. Each of the segments 3a of the retainer ring 3 is provided with a tapered surface 3b facing the opening 2a of the socket member 2, in order to facilitate insertion of the end 6a of the pipe 6. The retainer ring 3 is disposed in the annular space 2b of the socket member 2. The retainer ring 3 has an outside diameter which is greater than the diameter of the opening 2a in the socket member 2 so that the retainer ring 3 does not come off the socket member 2 when the pipe joint is not used. The inside diameter of the retainer ring 3 is selected to be slightly smaller than the outside diameter of the bead portion 7 of the pipe 6. When the pipe joint of this embodiment is used, the band 4 presses the segments 3a of the retainer ring 3 radially inwardly onto the outer peripheral surface of the pipe 6 so as to prevent the bead portion 7 from being extracted unintentionally.

In this embodiment, the pipe joint is used to connect one pipe 5 of two pipes 5, 6 to the other pipe 6 which constitutes a male member of the pipe joint. When two pipes are connected securely, the end portion 6a of the pipe 6 is seated on the bore portions 1b and 1c, while the bead portion 7 is seated on the bore portion 1a as will be seen from FIG. 2. A plurality of ring pairs, each including a seal ring 8a and a holder ring 8b, fit on the end portion of the pipe 6 adjacent to the bead portion 7. When the pipe 6 is inserted into the joint member 1, the seal rings 8a make sealing contact with the surface of the bore portion 1b of the intermediate diameter.

Figure 2:
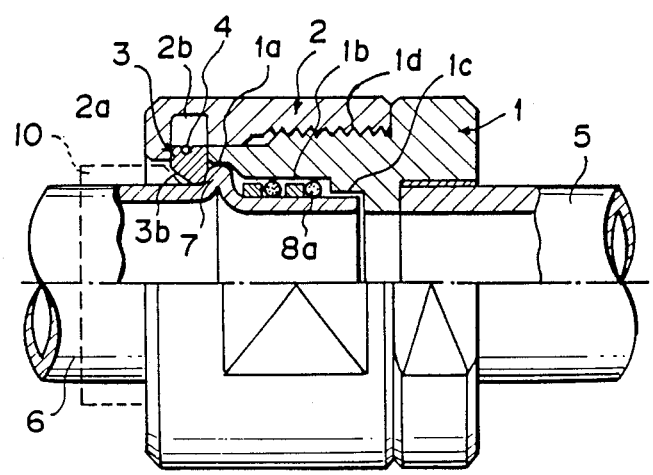
FIG. 2 is a fragmentary partly-sectioned elevational view of a first embodiment of the pipe joint in accordance with the present invention in a connected state.
Figure 3:
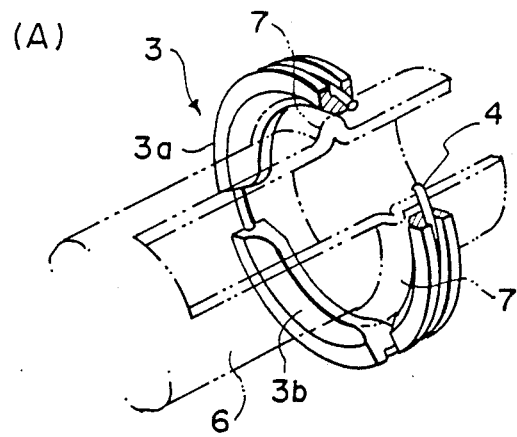
FIG. 3A and 3B are perspective views of a retainer ring used in the pipe joint of the present invention.
Figure 3:
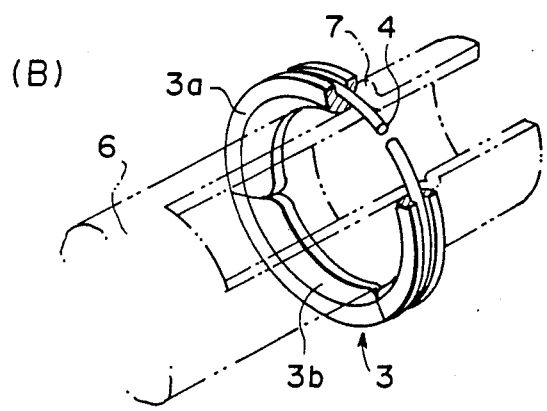
Figure 4:
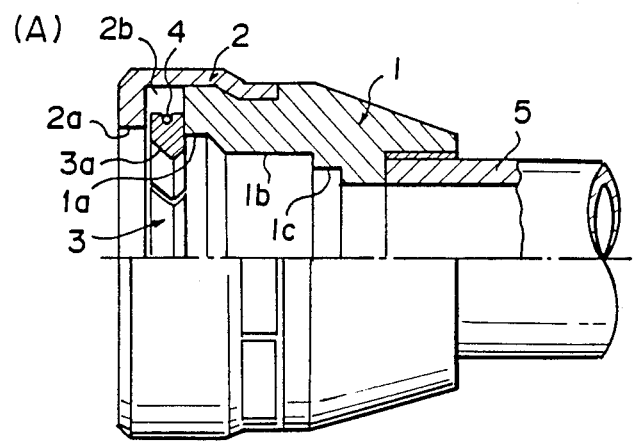
FIGS. 4A and 4B are fragmentary sectional views of a modification of the embodiment shown in FIG. 1.
Figure 4:
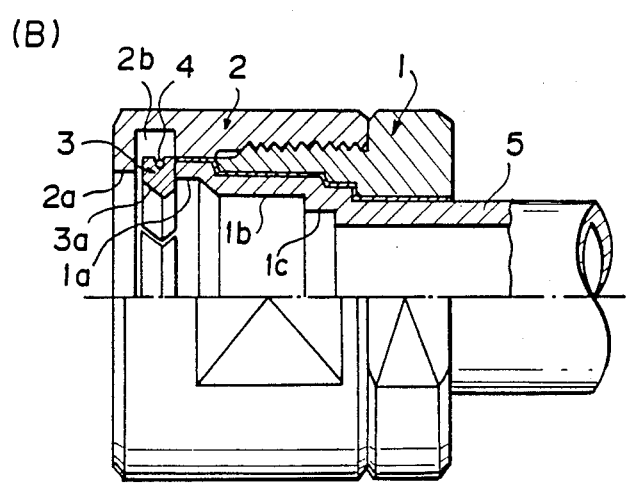

FIG. 4A shows a modification of the embodiment shown in FIGS. 1 and 2 in which the socket member 2 is fixed onto the joint member 1 by being caulked rather than by screwing engagement adopted in the embodiment shown in FIGS. 1 and 2.

FIG. 4B shows a modification in which the end of the pipe 5 is expanded and the bore portions 1a, 1b and 1c, which are formed in the joint member 1 in the embodiment shown in FIGS. 1 and 2, are formed in the pipe 5. This arrangement eliminates the necessity for the brazing which is required in the embodiment shown in FIGS. 1 and 2 for the purpose of fixing the joint member to the pipe 5.

The operation of the described embodiment is as follows. As the pipe 6 as the male member is inserted into the joint member through the opening 2a in the socket member 2, the bead portion 7 clears the opening 2a in the socket member 2 and is brought into contact with the tapered surfaces 3b of the segments 3a of the retainer ring 3 as shown in FIG. 3A. As the pipe 6 is further pressed into the joint member 1, the bead portion 7 advances while forcibly expanding the retainer ring 3 radially outwardly overcoming the resilient force of the elastic band 4 and is finally seated on the bore portion 1a in the joint member 1, as will be seen from FIGS. 2 and 3B. In this state, the seal rings 8a and holder rings 8b on the pipe 6 are received in the bore portion 1b, while the end 6a of the pipe 6 is seated on the bore portion 1c in the joint member 1. On the other hand, the retainer ring 3 contracts on the outer peripheral surface of the pipe joint. In consequence, the pipe 6 is hermetically and securely connected to the joint member 1 and, hence, to the pipe 5.

The disconnection of the pipes 5 and 6 from each other is conducted as follows. An annular member 10 (shown by a broken line in FIG. 2) is composed of a plurality of circumferential segments each having a tapered surface corresponding to the tapered surfaces 3b of the segments of the retainer ring 3 is fitted on the outer peripheral surface of the pipe 6 and is forcibly moved to slide along the surface of the pipe 6 so as to wedge into the retainer ring 3. Consequently, the retainer ring 3 is expanded radially outwardly due to the wedging action of the tapered surface of the annular member 10 on the tapered surface 3b of the segments 3a of the retainer ring 3. In this state, the pipe 6 is extracted so that the bead portion 7 can clear the retainer ring 3, whereby the pipe 6 is disconnected from the joint member 1 and, hence, from the pipe 5.

Figure 5:
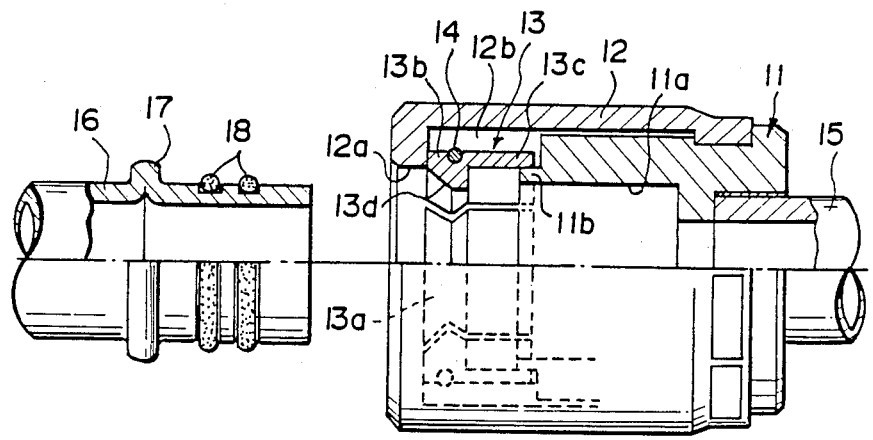
FIG. 5 is a fragmentary partly-sectioned elevational view of a second embodiment of the pipe joint in accordance with the present invention in a disconnected state.
Figure 6:
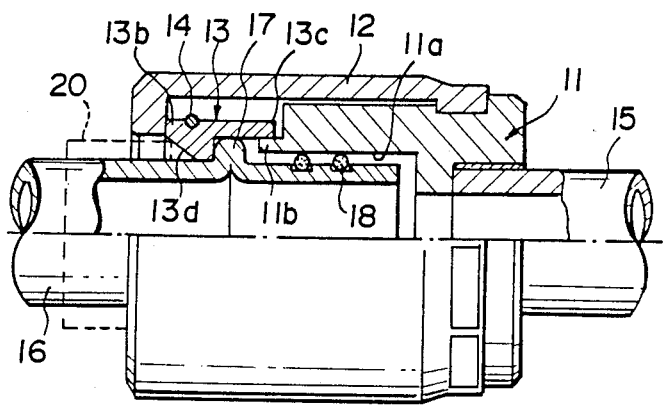
FIG. 6 is a fragmentary partly-sectioned elevational view of the embodiment shown in FIG. 5 in a connected state.
Figure 7:
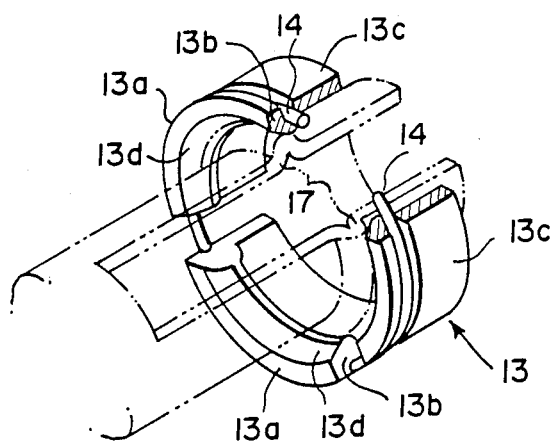
FIG. 7 is a perspective view of a retainer ring used in the pipe joint shown in FIGS. 5 and 6.

Another embodiment of the pipe joint in accordance with the present invention will be described hereinunder with reference to FIGS. 5 and 6.

This embodiment, the pipe joint is mainly composed of a joint member 11, a socket member 12, a retainer ring 13 and a pipe 16. Since the construction and function of these constituents are similar to those of the corresponding constituents in the preceding embodiment, the description will be mainly focused on points which distinguish this embodiment from the preceding embodiments.

One 15 of pipes 15, 16 to be connected to each other is fixed by brazing to the joint member 11. The joint member 1 is provided on the end thereof remote from the pipe 15 with an annular collar 11b adjacent to an opening of a bore 11a. The socket member 12 is fixed to the joint member 11 by caulking, and is provided with an annular flange having an opening 12a and an annular space 12b defined by the annular flange. The annular space 12b receives a retainer ring 13 composed of a plurality of segments 13a and is surrounded by an elastic band 14. Each segment 13a of the retainer ring 13 has a retaining portion 13b with a tapered surface 13d and a skirt portion 13c extending in the direction opposite to the retaining portion and contacting the outer peripheral portion of the collar 11b of the joint member 11. The skirt portions 13c of the segments 13a of the retainer ring 13 serve to maintain the retainer ring 13 coaxially with the joint member 11 and, hence, with the socket member 12. Thus, the skirt portions 13c of segments 13a of the retainer ring 13 and the cooperating annular collar 11b of the joint member 11 in combination constitute centering means.

This embodiment of the pipe joint is used for connecting one pipe 15 of the two pipes 15, 16 to the other pipe 16 which constitutes a male member of the pipe joint. The pipe 16 has an end portion which is adapted to be seated within the bore portion 11a of the joint member 11 and a bead portion 17 adjacent to the end portion. The bead portion 17 is so sized that it can fit on the inner peripheral surface of the skirt portions 13c of the segments 13a of the retainer ring 13. One or more seal rings 18 fit in annular grooves formed in the outer peripheral surface of the pipe 6.

In connecting the pipe 16 to the pipe 15, i.e., to the joint member 11, the pipe 16 is forced into the joint member 11 so that the bead portion 17 is brought into contact with the tapered surfaces 13d so as to forcibly expand the retainer ring 13 radially outwardly against the force of the elastic band 14, so that the bead portion 17 slides into the space inside the skirt portions 13c of the retainer ring segment 13a. In this state, the retainer ring 13 contracts radially inwardly so as to engage with the rear side of the bead portion 17 of the pipe 16, thus completing the connection as shown in FIG. 6. Disconnection of the pipe 16 from the joint member 11 can be conducted by means of an annular member 20 which is similar to the annular member 10 used in the preceding embodiment.

As will be understood from the foregoing description, the pipe joint of the invention can attain the required connection between a pair of pipes simply and quickly by inserting one of the pipes into a joint member fixed to the other pipe, without necessitating any specific connecting tool having a long stem such as a wrench. In addition, disconnection of pipes can be conducted easily and quickly by means of a simple annular jig.

What is claimed is:

1. A pipe connector for connecting two pipes to each other in an end to end fashion, said connector comprising:
   a male pipe member having an insertion end, said insertion end being defined by three distinct positions of increasing diameter from the distal end including an end portion, a sealing portion, and a bead portion, respectively;
   a female pipe member securely attached to a joint member, said joint member having a uniform diameter bore opening and an annular collar integrally extending from and parallel to said joint member;
   a socket member fixed to and encompassing said joint member, said socket member having an annular flange opening at a distal end thereof, thereby forming an annular space defined by said annular flange and joint member; and
   a retainer ring freely movably formed within said annular space, said retainer ring including a plurality of segments, each segment having a retaining portion abutting against an inner depending wall of said annular flange opening, a tapered surface at the inner diameter of said retaining portion, a skirt portion fitted to rest on said annular collar, a bead abutment surface intermediate said retaining portion and said skirt portion, and an elastic band circumscribing said retainer ring to provide a flexible resistance to expansion of said retainer ring;
   whereby said skirt portions of said retainer ring resting on said annular collar maintain said retainer ring coaxially with said joint member, thereby centering said retaining ring for receipt of said male pipe member;
   said bead portion being sized to abut against said annular collar of said joint member and said bead abutment surface of said retainer ring after said bead portion has radially expanded the retainer ring as the male member is inserted into the female member, whereby removal of said male pipe member from said female pipe member is prevented and relative movement of said male pipe member with respect to said female pipe member is restricted.

2. A pipe connector according to claim 1, wherein said sealing portion of said male pipe member includes at least one ring pair including a seal ring and a holder ring, said seal ring being adapted to make sealing contact with the surface of said bore in said joint member when said end portion of said male pipe member is received in said bore of said joint member.

3. A pipe connector according to claim 1, wherein two annular axially spaced grooves are formed in the outer peripheral surface of said end of said male member and seal rings are received in said annular grooves.

4. A pipe connector according to claim 1, wherein said joint member is securely fastened to said female pipe member by brazing and said socket member is fixed to said joint member by caulking.

* * * * *